United States Patent
Johnson et al.

(10) Patent No.: US 12,380,770 B2
(45) Date of Patent: Aug. 5, 2025

(54) OBJECT CLASSIFICATION AT POINT OF SALE

(71) Applicant: Toshiba Global Commerce Solutions, Inc., Durham, NC (US)

(72) Inventors: Brad M. Johnson, Raleigh, NC (US); Charles R. Kirk, Durham, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 351 days.

(21) Appl. No.: 18/118,867

(22) Filed: Mar. 8, 2023

(65) Prior Publication Data

US 2024/0304067 A1   Sep. 12, 2024

(51) Int. Cl.
    *G07G 1/00* (2006.01)
    *G01H 5/00* (2006.01)
    *G01H 7/00* (2006.01)
    *G06N 3/02* (2006.01)

(52) U.S. Cl.
    CPC ............. *G07G 1/0036* (2013.01); *G01H 5/00* (2013.01); *G01H 7/00* (2013.01); *G06N 3/02* (2013.01)

(58) Field of Classification Search
    CPC ...... G07G 1/0036; G07G 1/0063; G01H 5/00; G01H 7/00; G06N 3/02; G06Q 20/208
    See application file for complete search history.

(56) References Cited

U.S. PATENT DOCUMENTS

| | | | |
|---|---|---|---|
| 7,369,460 B2 | 5/2008 | Chiappetta | |
| 7,894,874 B2* | 2/2011 | Lynch | A61B 8/06 600/407 |
| 8,113,427 B2* | 2/2012 | Ross | G06Q 20/382 705/16 |
| 8,985,444 B2 | 3/2015 | Hammer | |
| 9,477,955 B2 | 10/2016 | Goncalves | |
| 9,712,738 B2* | 7/2017 | Van Heugten | H04N 23/959 |
| 11,132,993 B1* | 9/2021 | McDaniel | G10L 15/1807 |
| 2007/0262574 A1* | 11/2007 | Breed | B60R 21/01526 382/104 |
| 2013/0203345 A1* | 8/2013 | Fisher | H04B 11/00 455/41.1 |
| 2017/0011606 A1* | 1/2017 | Ceccon | G07G 1/0054 |
| 2018/0275259 A1 | 9/2018 | Ott | |
| 2018/0293567 A1* | 10/2018 | Seljeseth | G06Q 30/06 |
| 2021/0192162 A1* | 6/2021 | Rodriguez | G06Q 20/201 |

FOREIGN PATENT DOCUMENTS

CN    109870697 A  *  6/2019

* cited by examiner

*Primary Examiner* — Peter Ludwig
(74) *Attorney, Agent, or Firm* — Kaufman & Canoles, P.C.

(57) ABSTRACT

Systems and methods of object classification at point of sale are provided. In one exemplary embodiment, a method is performed by a POS system having processing circuitry operationally coupled to a transducer operable to radiate a pressure wave and a sensor operable to sense a pressure wave. Further, the transducer and the sensor are positioned on or about the POS system so that a field of radiation of the transducer and a field of detection of the sensor are directed towards a certain region of the POS system. The method includes receiving, from the sensor, a reflected signal that represents a pressure wave radiated by the transducer that is reflected from a surface of an object when in or about the certain region of the POS system so that the object can be classified as at least one of a set of object types based on the reflected signal.

18 Claims, 7 Drawing Sheets

OBJECT CLASSIFICATION AT POINT OF SALE

BACKGROUND

Retailers use point of sale (POS) hardware and software systems to streamline checkout operations and to allow retailers to process sales, handle payments, and store transactions for later retrieval. Each POS system generally include a number of components including a POS terminal station device and a POS bagging station device. POS bagging station devices can enable customers or retail staff to bag purchased retail items in shopping bags during checkout at the POS systems. POS terminal station devices can include a computer, a monitor, a cash drawer, a receipt printer, a customer display, a barcode scanner, or a debit/credit card reader. POS systems can also include a conveyor belt, a checkout divider, a weight scale, an integrated credit card processing system, a signature capture device, or a customer pin pad device. While POS systems may include a keyboard and mouse, more and more POS monitors use touchscreen technology. The POS software can be configured to handle a myriad of customer based functions such as sales, returns, exchanges, layaways, gift cards, gift registries, customer loyalty programs, promotions, and discounts. In a retail environment, there can be multiple POS systems in communication with a server over a network.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

The computational complexity in applying artificial intelligence for object identification increases dramatically as the set of objects that can be identified increases. For a retailer having thousands of products, the use of artificial intelligence for object identification may not be practical due to the time, energy, cost, or performance required to identify an object. Accordingly, there is a need for improved techniques to reduce the computational complexity in applying artificial intelligence for object detection. In addition, other desirable features and characteristics of the present disclosure will become apparent from the subsequent detailed description and embodiments, taken in conjunction with the accompanying figures and the foregoing technical field and background.

Figure 1A:
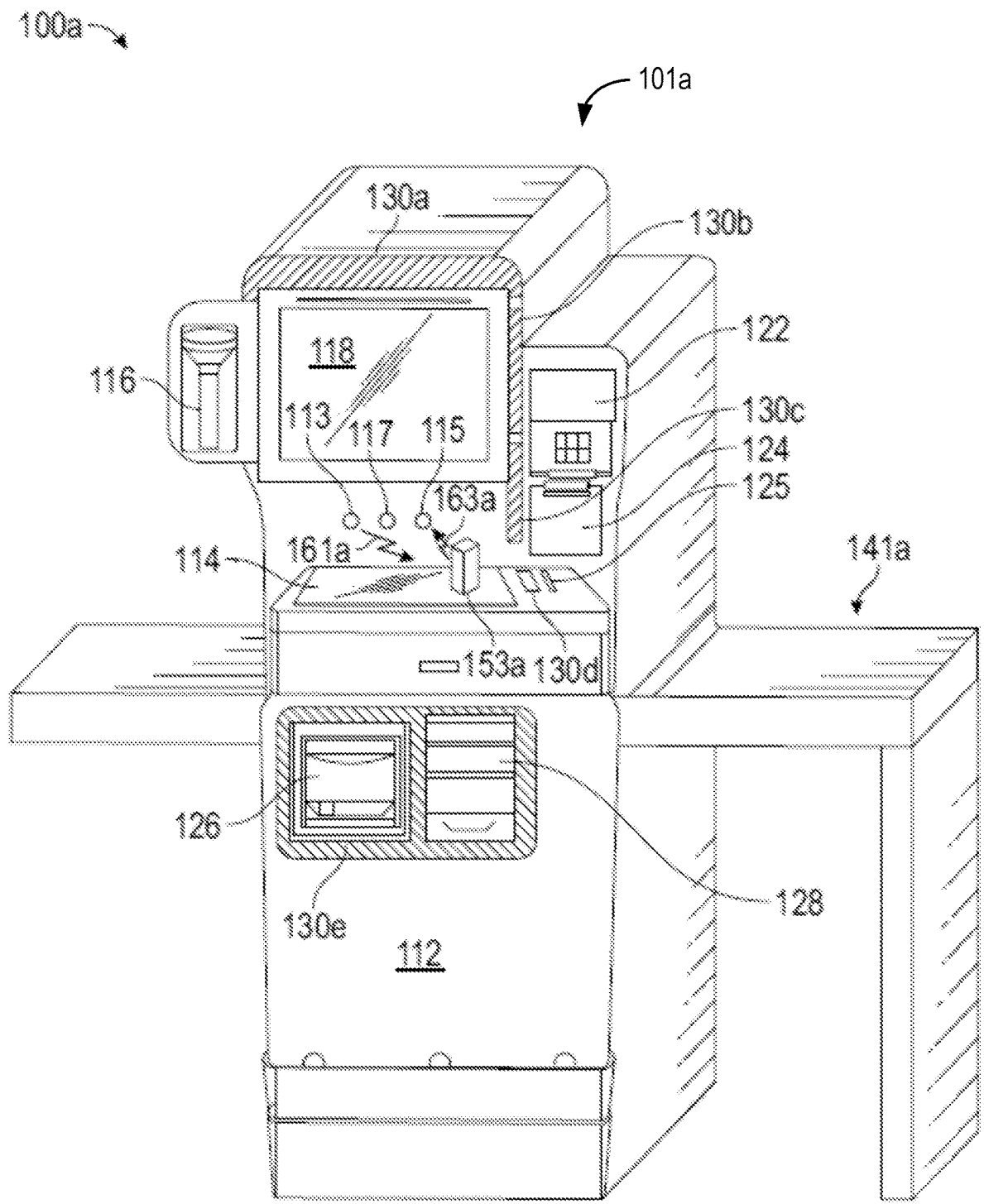
FIG. 1A-B illustrate embodiments of a POS system operable to perform object classification at point of sale in accordance with various aspects as described herein.
Figure 1B:
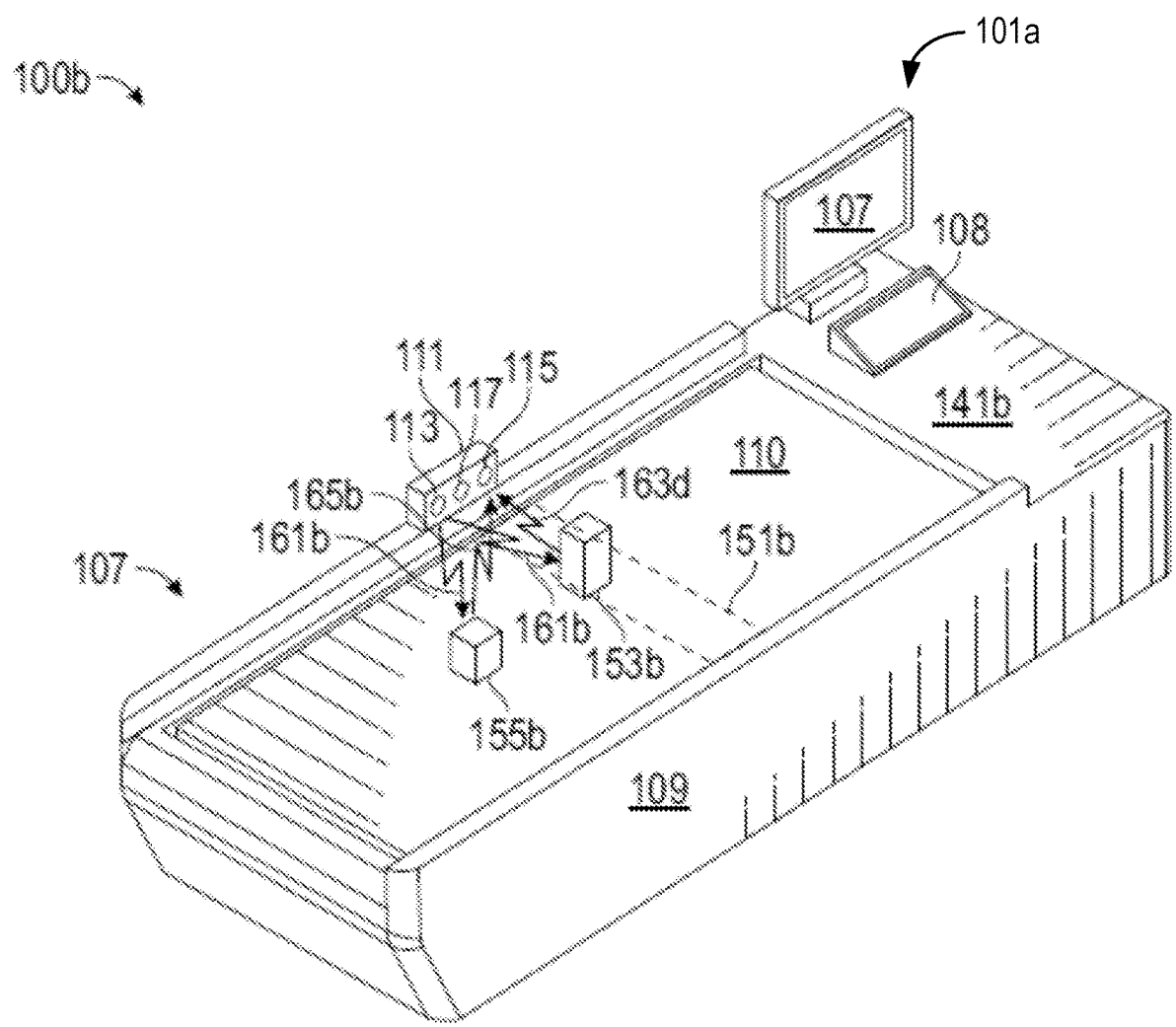

In this disclosure, systems and methods of object classification at point of sale are provided. For example, FIGS. 1A-B illustrate embodiments of a POS system 100a-b operable to perform object classification at point of sale in accordance with various aspects as described herein. As shown in FIG. 1A, the POS system 100a (e.g., checkout device, self-checkout device) can include a terminal station device 101a and a bagging station device 141a. The terminal station device 101a has a housing 112, one or more optical scanners 114, 116, a display device 118, a payment processing mechanism 122, a printer 124, a coupon slot mechanism 125, a cash acceptor mechanism 126, a change interface mechanism 128, the like, or any combination thereof. In addition, the terminal station device 101a can be configured to include a set of light emitting elements 130a-e (collectively, light emitting elements 130). The housing 112 can be configured to include a cabinet that contains a processing circuit operable to control the operations and functions of the POS system 100a. Each light emitting element 130a-e can be configured to be individually or collectively controlled by a processing circuit of the POS system 100a to indicate certain contextual information to a consumer. Although not explicitly shown herein, the housing 112 can also contain cabling and other functional components that communicatively couple the POS system 100a to a network or a network node device or that communicatively couple the terminal station device 101a to the bagging station device 141a. A network node device may include, for example, one or more server devices that may or may not be located in the retail store.

In FIG. 1A, each scanner 114, 116 can be configured as an optical scanner operable to scan a bar code displayed on retail items that a consumer intends to purchase. In one example, the scanner 116 can be configured as a hand-held, battery-operated scanner that the consumer removes from its battery charging dock to scan retail items without having to remove them from a shopping cart. For those situations where a retail item does not have a bar code, the scanner 114 can be operable to perform dual scanner and scale functions to allow the retail item to be contemporaneously scanned and weighed for purchase by a consumer. The display 118 can be operable to display information associated with retail items being purchased by a consumer. The payment processing mechanism 122 can be configured with a pinpad device operable to accept a non-cash payment vehicle (e.g., credit card or debit card), while the printer 124 can be configured to print receipts or coupons. The coupon slot mechanism 125 can include a generally elongated slot configured to receive coupons being redeemed by a consumer. The cash acceptor mechanism 126 can be operable to receive cash (e.g., paper money, coins) from the consumer for the retail items being purchased by the consumer. The change interface mechanism 128 can be operable to provide change to the consumer in the form of paper money or coins.

The terminal station device 101a also includes a transducer 113 (e.g., pressure wave transducer) and a first sensor 115 (e.g., pressure wave sensor). In one example, the transducer 113 is an ultrasonic transducer operable to convert electrical signals into ultrasonic pressure waves and the first sensor 115 is an ultrasound sensor operable to detect ultrasound pressure waves. Ultrasonic pressure waves can include frequencies from about twenty kilohertz (20 kHz) up to several gigahertz. In another example, the transducer 113 is a speaker operable to convert electrical signals into sound pressure waves and the first sensor 115 is a microphone operable to detect the sound pressure waves. Sound pressure waves can include frequencies up to twenty kilohertz (20 kHz). The transducer 113 and the first sensor 115 can be separate components or a single transceiver component. In FIG. 1A, the transducer 113 and the first sensor 115 are positioned on the terminal station device 101 so that the field of radiation of the transducer 113 and the field of detection of the first sensor 115 are directed towards a certain region associated with the surface of the optical scanner 114. In one example, the certain region is on or about the surface of the optical scanner 114. The terminal station device 101 may also include a second sensor 117 (e.g., presence, proximity or motion sensor) operable to detect a presence of an object on or about the surface of the optical scanner 114. The field of detection of the second sensor 117 can be towards the certain region on or about the surface of the optical scanner 114.

In operation, the processing circuitry of the POS system 101a receives, from the second sensor 117, a presence signal. The processing circuitry detects that an object 153a is on or about the surface of the optical scanner 114 based on the received presence signal. The processing circuitry determines to activate the transducer 113 based on the detected object 153a. As such, the processing circuitry sends, to the transducer 113, a pressure wave signal so that the transducer 113 can convert the pressure wave signal to a pressure wave 161a that is radiated towards the detected object 153a. The processing circuitry receives, from the first sensor 115, a reflected signal that represents the radiated pressure wave 161a that is reflected 163a from a surface of the detected object 153a. The processing circuit then classifies the detected object 153a as at least one of a set of object types based on the radiated presence signal 161a and the reflected signal 163a to obtain a classified object type of the detected object 153a. In one example, the set of object types is associated with the composition of product packaging (e.g., paper, metal, glass, plastic, and the like). In another example, the set of object types is associated with the density of an object. In yet another example, the set pf object types is associated with an amount of absorption of a pressure wave signal by an object. The processing circuit then identifies the detected object 153a based on the classified object type of the detected object 153a.

In FIG. 1B, the POS system 100b (e.g., checkout device, self-checkout device) can include a terminal station device 101b, a bagging station device 141b, a housing 109, and a conveyor belt apparatus 107 that includes a conveyor belt having a conveying surface 110 and a conveyor motor operable to advance the conveyor belt. The terminal station device 101b can include a barcode scanner, a scale, a keyboard 108, keypad, touchscreen 107, card reader, the like, or any combination thereof. The conveyor belt apparatus 107 can be disposed between the housing 109 such that the conveying surface 110 of the conveyor belt is configured to transfer items along a path from a first end to a second end associated with the terminal station device 101b. In one example, the conveyor belt apparatus 107 is operable to move the conveyor belt continuously. In another example, the conveyor belt apparatus 107 is operable to initiate movement of the conveyor belt when a sensor (e.g., presence sensor, motion sensor) detects a customer approaching the POS system 100b. In yet another example, the conveyor belt apparatus 107 is operable to initiate movement of the conveyor belt when a sensor (e.g., load sensor) detects any weight placed on the conveying surface 110 of the conveyor belt. In yet another example, the conveyor belt apparatus 107 is operable to initiate movement of the conveyor belt 110 when a sensor (e.g., presence, proximity or motion sensor) detects an object placed on the conveying surface 110 of the conveyor belt.

In FIG. 1B, the conveyor belt apparatus 107 can also be configured to include a housing 111 having the transducer 113 (e.g., pressure wave transducer), the first sensor 115 (e.g., pressure wave sensor), the second sensor 117 (e.g., presence, proximity or motion sensor), the like, or any combination thereof. The transducer 113, the first sensor 115, or the second sensor 117 can be disposed in the housing 111 so that the field of radiation of the transducer 113 and the fields of detection of the sensors 115, 117 are directed towards a certain region associated with the conveying surface 110 of the conveyor belt. In one example, the certain region is on or about the conveying surface 110 of the conveyor belt. In another example, the certain region includes the longitudinal center of the conveying surface 110 of the conveyor belt. In another example, the certain region is on or about a certain transverse region 151b of the conveying surface 110 of the conveyor belt.

Alternatively or additionally, the transducer 113, the first sensor 115, or the second sensor 117 can be disposed in an upper portion of the housing 109 so that the field of radiation of the transducer 113 and the fields of detection of the sensors 115, 117 are directed towards the certain region on or about the conveying surface 110 of the conveyor belt.

In operation, the processing circuitry of the POS system 101b receives, from the second sensor 117, a presence signal. The processing circuitry detects that an object 153b is in or about the certain region 151b of the conveying surface 110 of the conveyor belt. The processing circuitry determines to activate the transducer 113 based on the detected object 153b. As such, the processing circuitry sends, to the transducer 113, a pressure wave signal so that the transducer can convert the pressure wave signal to a pressure wave 161b that is radiated towards the certain region 151b. The processing circuitry receives, from the first sensor 115, a reflected signal that includes a primary reflection component 163b and a secondary reflection component 165b. The primary reflection component 163b represents the radiated pressure wave 161b that is directly reflected from the surface of the detected object 153b. Further, the secondary reflection component 165b represents the radiated pressure wave 161b that is directly reflected from the surface of another object 155b or indirectly reflected from the surface of the detected object 153b and then the surface of the other object 155b. The time delay of the secondary reflection component 165b is greater than the time delay of the primary reflection component 163b, with the delay corresponding to a time period from radiation of the pressure wave by the transducer 113 to sensing a reflected pressure wave by the first sensor 115. The processing circuitry may determine the time delay or magnitude of the primary reflected component 163b based on the pressure wave signal and the received reflected signal. The processing circuitry may determine to classify the detected object based on determining that the time delay or magnitude of the primary reflected component 163b is no more than a predetermined threshold that corresponds to an object being in or about the certain region 151b.

Additionally or alternatively, the processing circuitry may determine to classify the detected object 153b based on determining that the time delay or magnitude is no more than a predetermined threshold that corresponds to a certain field of radiation of the transducer 113 or a certain field of detection of the first sensor 115. The processing circuitry then classifies the detected object 153b as at least one of the set of object types based on the radiated presence signal and the received reflected signal to obtain a classified object type of the detected object 153b. The processing circuitry then identifies the detected object 153b based on the classified object type of the detected object 153b.

In another embodiment, the processing circuitry determines a magnitude and a phase of the primary and secondary reflection components of the reflected signal based on the pressure wave signal and the reflected signal. The processing circuitry suppresses the secondary reflection component based on the magnitude and phase of the primary and secondary reflection components. The processing circuitry then determines the primary reflection component based on the magnitude and phase of the primary and secondary reflection components. The processing circuitry can classify the detected object 153b as at least one of the set of object types based on the primary reflection component to obtain the classified object type of the detected object 153b.

In another embodiment, the processing circuitry can process the reflected signal having the primary and secondary reflection components to suppress the secondary reflection component based on the pressure wave signal and the reflected signal. The processing circuitry can then extract a property of the primary reflection component. The property can be represented by time-domain waveforms, frequency domain spectrum plots, time-frequency spectrograms, the like, or any combination thereof. In one example, the property is a time representation (e.g., amplitude envelope waveform, short-time energy waveform, root mean square energy waveform, zero-crossing rate) of the primary reflection component. In another example, the property is a frequency representation (e.g., mean or average frequency, median frequency, signal-to-noise ratio, band energy ratio) of the primary reflection component. In yet another example, the property is a time-frequency domain representation of the primary reflection component such as the mel-frequency cepstral coefficients (MFCCs). The processing circuitry can send, to neural network circuitry, the extracted property. The neural network can be trained with the property extracted from primary reflection components of each of the set of object types. In response, the processing circuit can receive, from the neural network circuit, an indication that includes the classified object type and a confidence level of the classified object type. The confidence level indicates a likelihood that the classified object type is indeed that classified object type. The processing circuitry can then identify the detected object 153b based on the classified object type of the detected object 153b and the confidence level of the classified object type.

In another embodiment, the processing circuitry receives, from a third sensor (e.g., optical sensor, camera) of the POS system 100a-b, an indication that includes an image of the object captured by the third sensor. The processing circuitry extracts a feature associated with the object displayed in the image. A skilled artisan will readily recognize techniques associated with feature extraction in object identification. Further, the processing circuitry sends, to second neural network circuitry, the extracted feature of the displayed object and the classified object type. The second neural network circuitry is trained with features extracted from images that display each of a set of objects (e.g., retail products). Further, the set of objects are classified based on the set of object types. The second neural network circuitry performs object identification of those objects having the received classified object type based on the extracted feature. The processing circuitry receives, from the second neural network circuitry, an indication that includes at least one of the set of objects of the classified object type identified as having the extracted feature and a confidence level of each identified object. In addition, the method further includes identifying the detected object based on the at least one of the set of objects of the classified object type identified as having the extracted feature and the confidence level of each identified object.

In another embodiment, the processing circuitry receives, from a third sensor (e.g., optical sensor, camera) of the POS system 100a-b, an image that includes display of the detected object. The processing circuitry extracts a feature associated with the detected object based on the image. Further, the processing circuitry sends, to a network node (e.g., server) having second neural network circuitry, the extracted feature and the classified object type. The second neural network circuitry is trained with features extracted from images that display each of a set of objects (e.g., retail products). Further, the set of objects are classified based on the set of object types. The second neural network circuitry performs object identification of those objects having the received classified object type based on the extracted feature. The processing circuitry receives, from the network node, an indication that includes at least one of the set of objects of the classified object type identified as having the extracted feature and a confidence level of each identified object. In addition, the method further includes identifying the detected object based on the at least one of the set of objects of the classified object type identified as having the extracted feature and the confidence level of each identified object.

In another embodiment, the processing circuitry receives, from a third sensor (e.g., optical sensor, camera) of the POS system 100a-b, an image that includes display of the detected object. The processing circuitry sends, to a network node (e.g., server) having second neural network circuitry, the image that includes display of the displayed object and the classified object type. The second neural network circuitry is trained with features extracted from images that display each of a set of objects (e.g., retail products). Further, the set of objects are classified based on the set of object types. The second neural network circuitry performs object identification of the set of objects having the received classified object type based on the image. The processing circuitry receives, from the network node, an indication that includes at least one of the set of objects of the classified object type identified as the detected object and a confidence level of each identified object. In addition, the method further includes identifying the detected object based on the at least one of the set of objects of the classified object type identified as having the extracted feature and the confidence level of each identified object.

In another embodiment, the housing 111 can include the third sensor (e.g., optical sensor, camera) so that the field of radiation of the transducer 113, the fields of detection of the first and second sensors 115, 117, and the field of view of the third sensor are directed towards the certain region on or about the conveying surface 110 of the conveyor belt. The processing circuitry of the POS system 101b receives, from the second sensor 117, a presence signal. The processing circuitry detects that the object 153b is in or about the certain region 151*b* of the conveying surface 110 of the conveyor belt based on the presence signal. The processing circuitry determines to activate capture of an image by the third sensor based on the detected object 153*b*. As such, the processing circuitry sends, to the third sensor, an indication to capture an image. The processing circuitry then receives, from the third sensor, an image that includes display of the detected object 153*b*.

Alternatively or additionally, the transducer 113, the first sensor 115, the second sensor 117, or the third sensor can be disposed in an upper portion of the housing 109 so that the field of radiation of the transducer 113, the fields of detection of the first and second sensors 115, 117, and the field of view of the third sensor are directed towards the certain region on or about the conveying surface 110 of the conveyor belt.

In another embodiment, the combination of the transducer 113 and the first sensor 115 are configured to detect a presence of an object on the surface of the scanner 114 or the conveying surface 110 of the conveyor belt.

Figure 2:
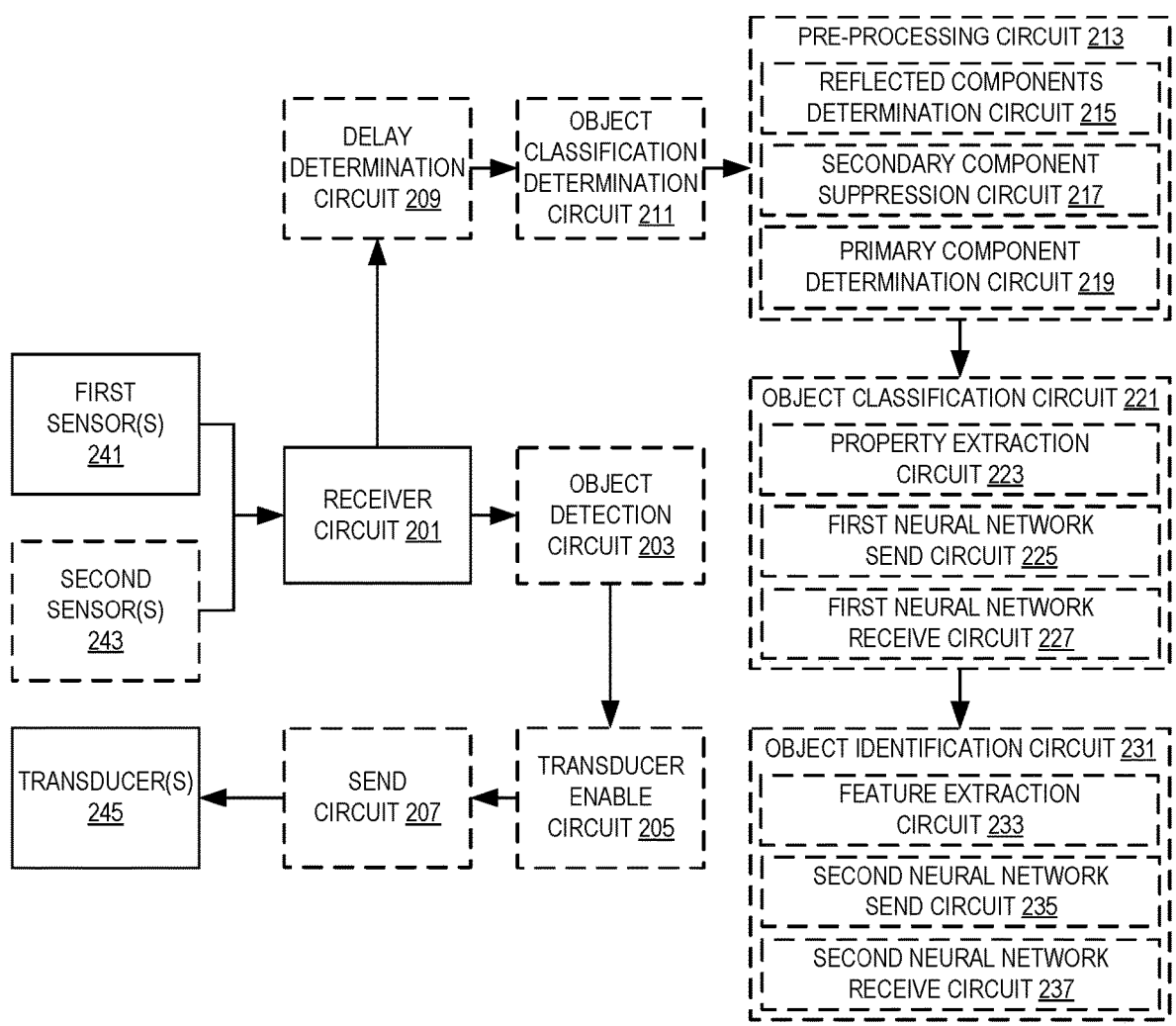
FIG. 2 illustrates one embodiment of a POS system in accordance with various aspects as described herein.

FIG. 2 illustrates one embodiment of a POS system 200 in accordance with various aspects as described herein. In FIG. 2, the device 200 implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: a receiver circuit 201 operable to receive information such as from first and second sensors 241, 243; an object detection circuit 203 operable to detect an object from sensor measurement information such as from sensor 241, 243; a transducer enable circuit 205 operable to enable a transducer such as transducer 245; a send circuit 207 operable to send information such as to transducer 245; a delay determination circuit 209 operable to determine a time delay between sending a pressure wave and receiving a reflection of that pressure wave; an object classification determination circuit 211 operable to determine whether to classify an object based on a set of object types; a pre-processing circuit 213 operable to pre-process a received reflection signal; an object classification circuit 221 operable to classify an object as at least one of the set of object types; and an object identification circuit 231 operable to identify an object as at least one of a set of objects having the classified object type.

The functional means, units, modules, or circuits for implementing the pre-processing means, unit, module, or circuit 213 may include for instance: a reflected components determination circuit 215 operable to determine primary and secondary reflected components of a received reflected signal; a secondary reflected component suppression circuit 217 operable to suppress the secondary reflected component in the received reflected signal; and a primary reflected component determination circuit 219 operable to determine the primary reflected component.

The functional means, units, modules, or circuits for implementing the object classification means, unit, module, or circuit 221 may include for instance: a property extraction circuit 223 operable to extract a property from the primary reflected component; a first neural network send circuit 225 operable to send information to the first neural network; and a first neural network receive circuit 227 operable to receive information from the first neural network.

The functional means, units, modules, or circuits for implementing the object identification means, unit, module, or circuit 231 may include for instance: a feature extraction circuit 233 operable to extract a feature from an image of a classified object; a second neural network send circuit 235 operable to send information to the second neural network; and a second neural network receive circuit 237 operable to receive information from the second neural network.

Figure 3:
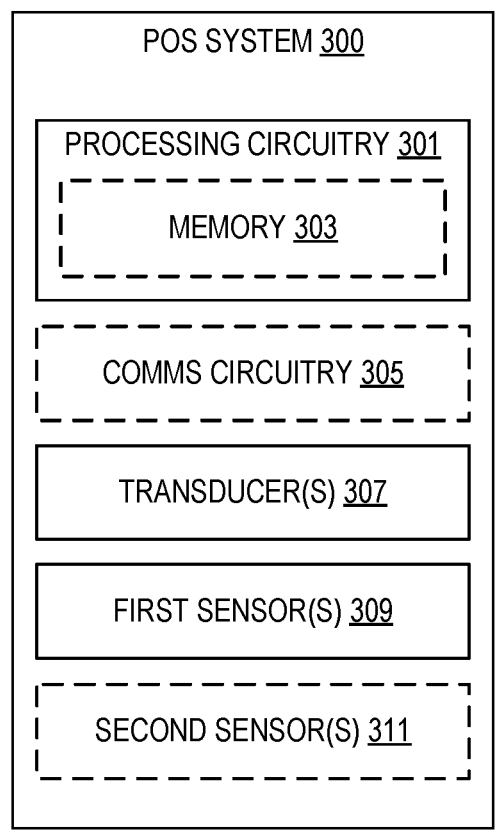
FIG. 3 illustrates another embodiment of a POS system in accordance with various aspects as described herein.

FIG. 3 illustrates another embodiment of a POS system 300 in accordance with various aspects as described herein. In FIG. 3, the device 300 may include processing circuitry 301 that is operably coupled to one or more of the following: memory 303, network communications circuitry 305, one or more transducers 307, one or more first sensors 309 (e.g., audio sensor, ultrasound sensor), one or more second sensors 311 (e.g., presence, proximity or motion sensor), the like, or any combination thereof. The network communication circuitry 305 is configured to transmit or receive information to or from one or more other devices via any communication technology. The processing circuitry 301 is configured to perform processing described herein, such as by executing instructions stored in memory 303. The processing circuitry 301 in this regard may implement certain functional means, units, or modules.

Figure 4A:
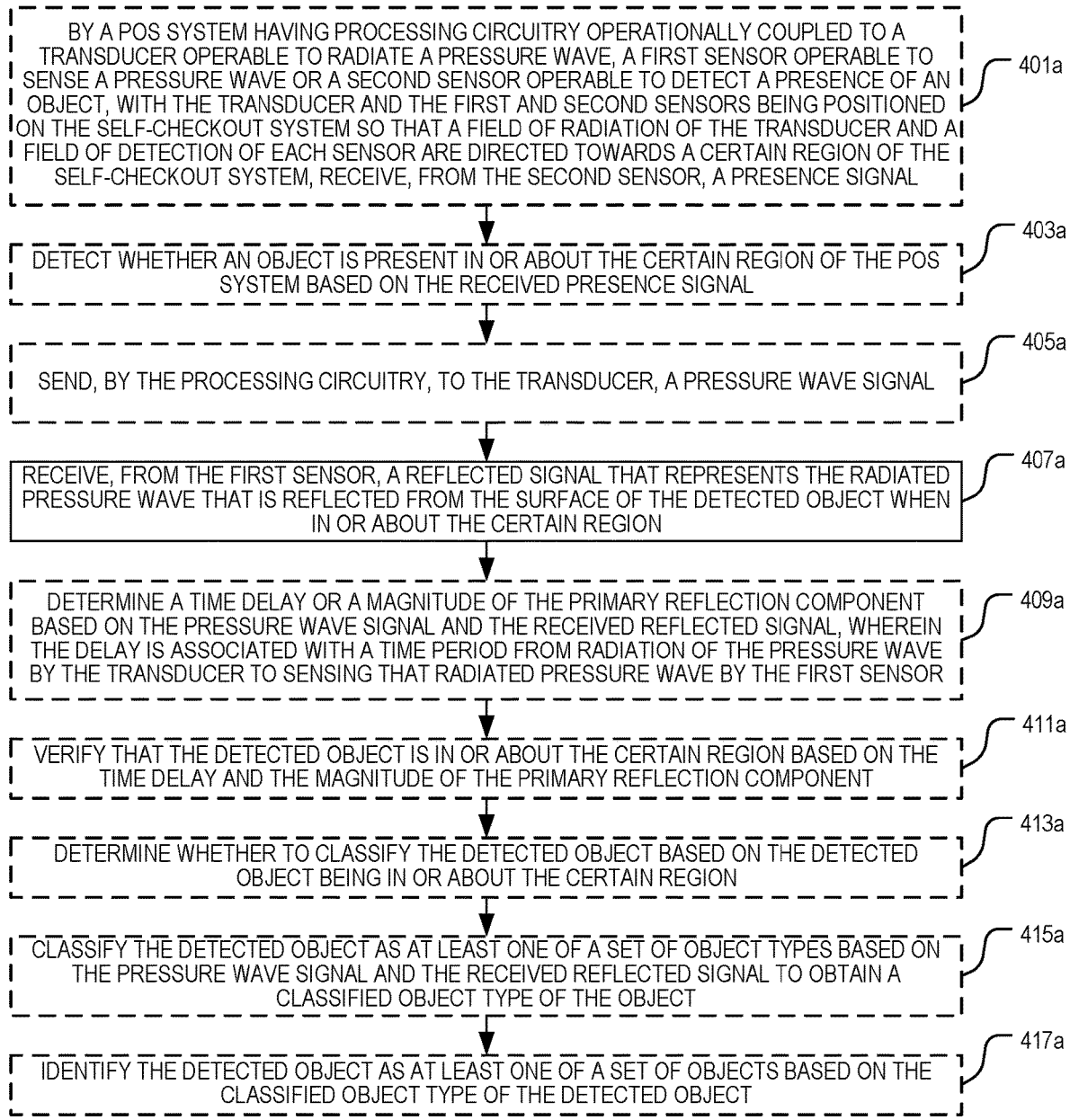
FIG. 4A-C illustrate embodiments of a method performed by a POS system of object classification at point of sale with various aspects as described herein.

FIG. 4A illustrates one embodiment of a method 400*a* performed by a POS system 100*a-b*, 200, 300, 500 of object classification at point of sale in accordance with various aspects as described herein. In FIG. 4A, the method 400*a* may start, for instance, at block 401*a* where it may include receiving, from a second sensor (e.g., proximity, motion or presence sensor), a presence signal. At block 403*a*, the method 400*a* may include detecting that an object is present in or about the certain region of the POS system 100*a-b*, 200, 300, 500 based on the received presence signal. In response, the method 400*a* may include sending, to the transducer, a pressure wave signal, as represented by block 405*a*. At block 407*a*, the method 400*a* includes receiving, from the first sensor (e.g., pressure wave sensor such as a microphone or ultrasound sensor), a reflected signal that represents the radiated pressure wave that is reflected from the surface of the detected object when in or about the certain region of the POS system 100*a-b*, 200, 300, 500. At block 409*a*, the method 400*a* may include determining a time delay or a magnitude of the primary reflection component based on the pressure wave signal and the received reflected signal. The method 400*a* may include verifying that the detected object is in or about the certain region of the POS system 100*a-b*, 200, 300, 500 based on the time delay or the magnitude of the primary reflection component, as represented by block 411*a*. At block 413*a*, the method 400*a* may include determining whether to classify the detected object based on the detected object being in or about the certain region. In response, the method 400*a* may include classifying the detected object as at least one of a set of object types (e.g., packaging materials, product density, radiation absorption) based on the pressure wave signal and the received reflected signal to obtain a classified object type of the object, as represented by block 415*a*. At block 417*a*, the method 400*a* may include identifying the object as at least one of a set of objects based on the classified object type of the detected object.

Figure 4B:
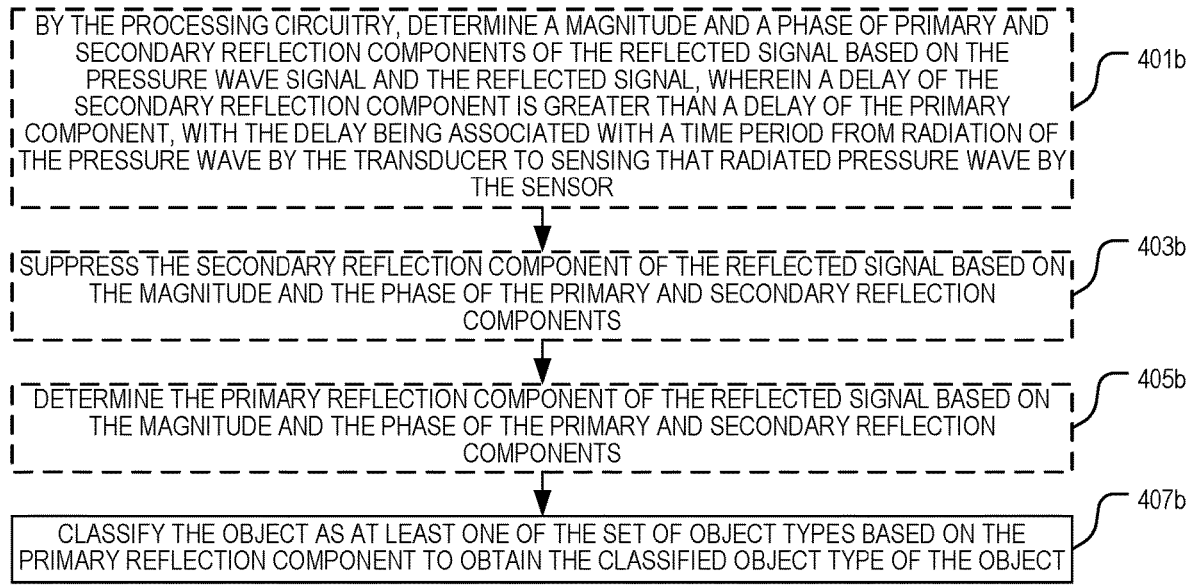

FIG. 4B illustrates one embodiment of a method 400*b* performed by a POS system 100*a-b*, 200, 300, 500 of object classification at point of sale in accordance with various aspects as described herein. In FIG. 4B, the method 400*b* may start, for instance, at block 401*b* where it may include determining a magnitude and a phase of primary and secondary reflection components of the reflected signal based on the pressure wave signal and the reflected signal. At block 403*b*, the method 400*b* may include suppressing the secondary reflection component of the reflected signal based on the magnitude and the phase of the primary and secondary reflection components. At block 405b, the method 400b may include determining the primary reflection component of the reflected signal based on the magnitude and the phase of the primary and secondary reflection components. The method 400b includes classifying the object as at least one of the set of object types based on the primary reflection component to obtain the classified object type of the object.

Figure 4C:
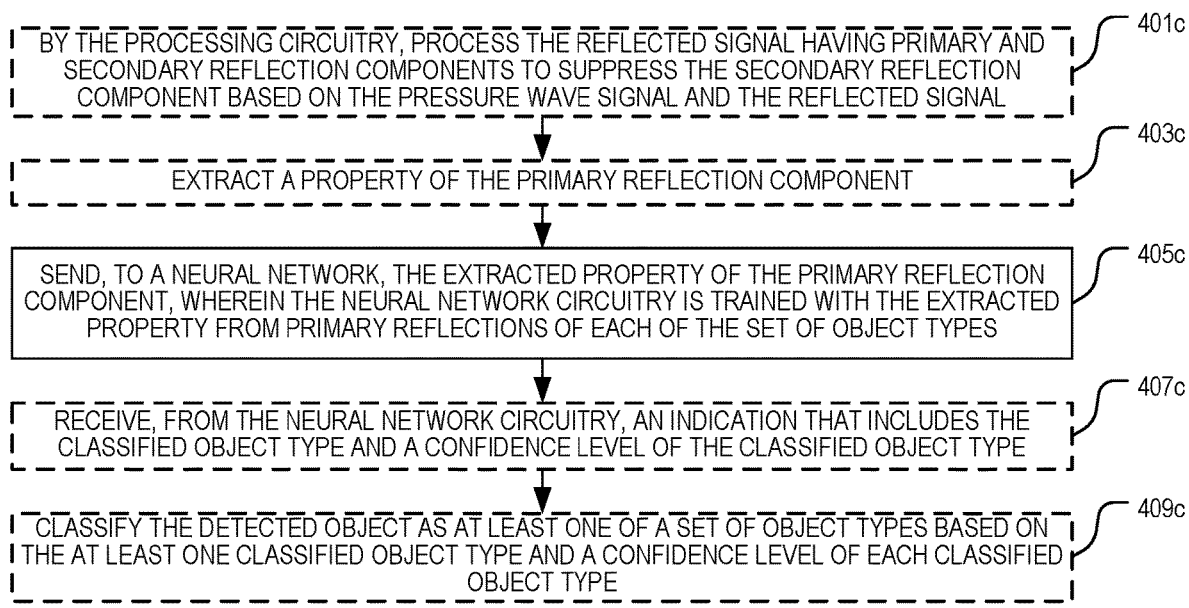

FIG. 4C illustrates one embodiment of a method 400c performed by a POS system 100a-b, 200, 300, 500 of object classification at point of sale in accordance with various aspects as described herein. In FIG. 4C, the method 400c may start, for instance, at block 401c where it may include processing the reflected signal having primary and secondary reflection components to suppress the secondary reflection component based on the pressure wave signal and the reflected signal. At block 401c, the method 400c may include extracting a property of the primary reflection component. At block 403c, the method 400c includes sending, to neural network circuitry, the extracted property of the primary reflection component. The method 400c may include receiving, from the neural network circuitry, an indication that includes the classified object type and a confidence level of the classified object type, as represented by block 407c. At block 409c, the method 400c may include classifying the detected object as at least one of a set of object types based on the at least one classified object type and a confidence level of each classified object type.

Figure 5:
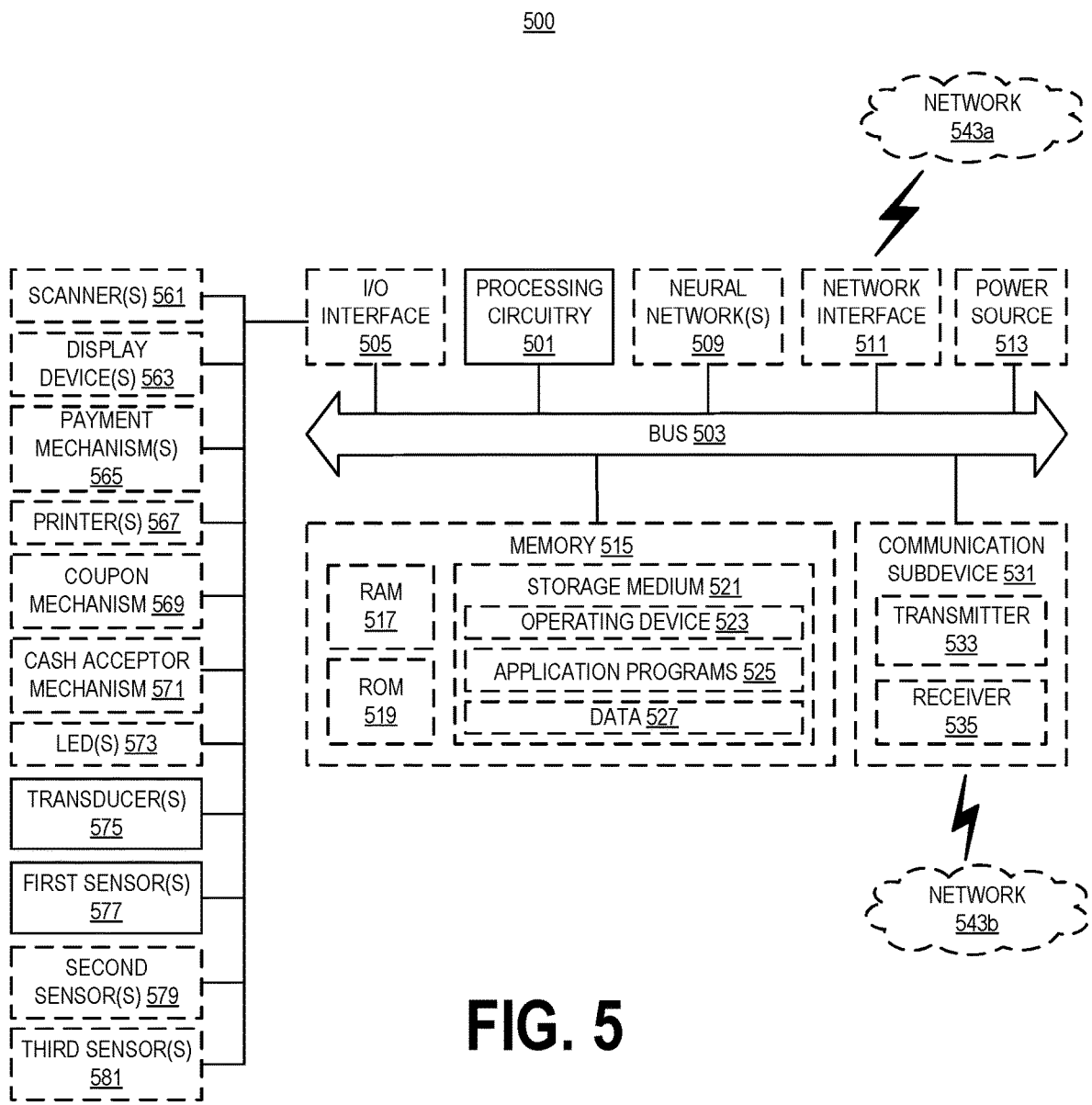
FIG. 5 illustrates another embodiment of a POS system in accordance with various aspects as described herein.

FIG. 5 illustrates another embodiment of a POS system 500 in accordance with various aspects as described herein. In FIG. 5, device 500 includes processing circuitry 501 that is operatively coupled over bus 503 to input/output interface 505, neural network circuitry 509, network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The device 500 may be configured to use an output device via input/output interface 505. An output device 561 may use the same type of interface port as an input device. For example, a USB port or a Bluetooth port may be used to provide input to and output from the device 500. The output device may be a speaker, a sound card, a video card, a display, a monitor, a printer, an actuator, a transducer 575 (e.g., speaker, ultrasound emitter), an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor, (e.g., a digital camera, a digital video camera, a web camera, etc.), a microphone, a first sensor 577 (e.g., pressure wave sensor), a second sensor 579 (e.g., presence, proximity or motion sensor), a third sensor 581 (e.g., optical sensor, camera), a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, a microphone, an ultrasound sensor, another like sensor, or any combination thereof. As shown in FIG. 500, the input/output interface 505 can be configured to provide a communication interface to components of the terminal station device 101a such as the scanners 114, 116, the display device 118, the payment processing mechanism 122, the printer 124, the coupon slot mechanism 125, the cash acceptor mechanism 126, light emitting devices 130, the like, or any combination thereof. Further, the input/output interface 505 can be configured to provide a communication interface to components of the terminal station device 101b such as a barcode scanner, a scale, keyboard 108, keypad, touchscreen 107, card reader, the like, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection, classification or identification. In one example, first neural network circuitry is configured to perform object classification as described herein. Further, second neural network circuitry is configured to perform object identification as described herein. In FIG. 5, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by POS system having processing circuitry operationally coupled to a transducer operable to radiate a pressure wave and a sensor operable to sense a pressure wave. Further, the transducer and the sensor are positioned on or about the POS system so that a field of radiation of the transducer and a field of detection of the sensor are directed towards a certain region of the POS system. The method includes receiving, by the processing circuitry, from the sensor, a reflected signal that represents a pressure wave radiated by the transducer that is reflected from a surface of an object when in or about the certain region of the POS system so that the object can be classified as at least one of a set of object types based on the reflected signal.

In another exemplary embodiment, the method further includes sending, by the processing circuitry, to the transducer, a pressure wave signal. Further, the transducer is operable to convert a pressure wave signal to the pressure wave.

In another exemplary embodiment, the method further includes determining a magnitude and a phase of primary and secondary reflection components of the reflected signal based on the pressure wave signal and the reflected signal. The primary reflection component corresponds to a direct reflection of the radiated pressure signal from the object and the secondary reflection corresponds to an indirect reflection of the radiated pressure signal from the object or a reflection of the radiated pressure signal from another object. A time delay of the secondary reflection component is greater than a time delay of the primary component, with the time delay being associated with a time period from radiation of the pressure wave by the transducer to sensing a reflection of that radiated pressure wave by the sensor. The method further includes obtaining the primary reflection component of the reflected signal based on the magnitude and the phase of the primary and secondary reflection components. In addition, the method further includes classifying the object as at least one of the set of object types based on the primary reflection component to obtain a classified object type of the object. the method also includes identifying the object as at least one of a set of objects based on the classified object type of the object.

In another exemplary embodiment, the primary reflection component obtaining step includes suppressing the secondary reflection component of the reflected signal based on the magnitude and the phase of the primary and secondary reflection components.

In another exemplary embodiment, the method further includes classifying the object as at least one of a set of object types based on the reflected signal to obtain a classified object type of the object.

In another exemplary embodiment, the method further includes determining a time delay and a magnitude of the primary reflection component based on the pressure wave signal and the reflected signal. Further, the time delay is associated with a time period from radiation of the pressure wave by the transducer to sensing a reflection of that radiated pressure wave by the sensor. The method further includes determining to classify the object responsive to determining that the object is in or about the certain region of the POS system based on the time delay and the magnitude of the primary reflection component.

In another exemplary embodiment, the method further includes processing the reflected signal having primary and secondary reflection components to suppress the secondary reflection component of the reflected signal. Further, a time delay of the secondary reflection component is greater than a time delay of the primary component, with the time delay being associated with a time period from radiation of the pressure wave by the transducer to sensing a reflection of that radiated pressure wave by the sensor. The method further includes extracting a property of the primary reflection component based on the processed reflected signal. In addition, the classifying step includes classifying the primary reflection component as at least one of the set of object types based on the extracted property of the primary reflection component.

In another exemplary embodiment, the method further includes sending, by the processing circuitry, to neural network circuitry, the extracted property. Further, the neural network circuitry is trained with the property extracted from primary reflection components of each object type. The method further includes receiving, by the processing circuitry, from the neural network circuitry, an indication that includes the classified object type and a confidence level of the classified object type. In addition, the method further includes identifying the object as at least one of a set of objects based on the classified object type of the object and the confidence level of the classified object type.

In another exemplary embodiment, the POS system includes a terminal station device operationally coupled to a conveyor belt apparatus having a conveyor belt configured to transfer items along a path from a first end to a second end associated with the terminal station device, with the transducer and the sensor being positioned on or about a top portion of the conveyor belt apparatus so that the field of radiation of the transducer and the field of detection of the sensor are directed towards the certain region on or about a surface of the conveyor belt.

In another exemplary embodiment, the POS system includes a terminal station device having a second sensor operable to sense when an object is in or about the certain region of the POS system. Further, the second sensor is positioned on or about the POS system so that a field of detection of the second sensor is directed towards the certain region of the POS system. The method further includes receiving, by the processing circuit, from the second sensor, a presence signal. The method further includes detecting whether an object is present in or about the certain region of the POS system. In addition, the method further includes sending, by the processing circuitry, to the transducer, a pressure wave signal responsive to determining that the object is detected in or about the certain region of the POS system.

In another exemplary embodiment, the method further includes identifying the object as at least one of a set of objects based on the classified object type of the object.

In another exemplary embodiment, the object types are associated with packaging material.

In another exemplary embodiment, at least one object type is associated with a plastic packaging material.

In another exemplary embodiment, the transducer is an ultrasonic transducer, the sensor is an ultrasonic sensor, and the pressure wave includes one or more frequencies of at least twenty kilohertz (20 kHz).

In one embodiment, a POS system includes processing circuitry operationally coupled to a transducer operable to radiate a pressure wave and a sensor operable to sense a pressure wave. Further, the transducer and the sensor are positioned on or about the POS system so that a field of radiation of the transducer and a field of detection of the sensor are directed towards a certain region of the POS system. The POS system further includes a memory, with the memory containing instructions executable by the processing circuitry whereby the processing circuitry is configured to receive, from the sensor, a reflected signal that represents a pressure wave radiated by the transducer that is reflected from a surface of an object when in or about the certain region of the POS system so that the object can be classified as at least one of a set of object types based on the reflected signal.

In another exemplary embodiment, the memory includes further instructions executable by the processing circuitry whereby the processing circuitry is configured to: determine a magnitude and a phase of primary and secondary reflection components of the reflected signal based on the pressure wave signal and the reflected signal; obtain the primary reflection component of the reflected signal based on the magnitude and the phase of the primary and secondary reflection components; classify the object as at least one of the set of object types based on the primary reflection component to obtain a classified object type of the object; and identify the object as at least one of a set of objects based on the classified object type of the object.

In another exemplary embodiment, the memory includes further instructions executable by the processing circuitry whereby the processing circuitry is configured to: determine a time delay and a magnitude of the primary reflection component based on the pressure wave signal and the reflected signal; and determine to classify the object responsive to determining that the object is in or about the certain region of the POS system based on the time delay and the magnitude of the primary reflection component.

In another exemplary embodiment, the memory includes further instructions executable by the processing circuitry whereby the processing circuitry is configured to: process the reflected signal having primary and secondary reflection components to suppress the secondary reflection component of the reflected signal; extract a property of the primary reflection component based on the processed reflected signal; classify the primary reflection component as at least one of the set of object types based on the extracted property; and identify the object as at least one of a set of objects based on the at least one classified object type of the object.

In another exemplary embodiment, the memory includes further instructions executable by the processing circuitry whereby the processing circuitry is configured to: send, to neural network circuitry, the extracted property, wherein the neural network circuitry is trained with the property extracted from primary reflections of each object type; receive, from the neural network circuitry, an indication that includes the classified object type and a confidence level of the classified object type; and identify the object as at least one of a set of objects based on the classified object type of the object and the confidence level of the classified object type . . . .

In another exemplary embodiment, the POS system includes a terminal station device having a second sensor operable to sense when an object is present in or about the certain region of the POS system. Further, the second sensor is positioned on or about the POS system so that a field of detection of the second sensor is directed towards the certain region of the POS system. The memory includes further instructions executable by the processing circuitry whereby the processing circuitry is configured to: receive, from the second sensor, a presence signal; determine whether an object is present in or about the certain region of the POS system based on the presence signal; and send, to the transducer, a pressure wave signal responsive to determining that the object is present in or about the certain region of the POS system.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively or additionally, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a point of sale (POS) system having processing circuitry operationally coupled to a transducer operable to radiate a pressure wave and a sensor operable to sense a pressure wave, with the transducer and the sensor being positioned on or about the POS system so that a field of radiation of the transducer and a field of detection of the sensor are directed towards a certain region of the POS system,
receiving, by the processing circuitry, from the sensor, a reflected signal that represents the pressure wave radiated by the transducer that is reflected from a surface of an object when in or about the certain region of the POS system so that the object can be classified as at least one of a set of object types based on the reflected signal;
determining a magnitude and a phase of primary and secondary reflection components of the reflected signal based on a pressure wave signal that represents the pressure wave radiated by the transducer and the reflected signal, wherein the primary reflection component corresponds to a direct reflection of the radiated pressure wave from the object and the secondary reflection corresponds to an indirect reflection of the radiated pressure wave from the object or a reflection of the radiated pressure wave from another object, with a time delay of the secondary reflection component being greater than a time delay of the primary component, with the time delay being associated with a time period from radiation of the pressure wave by the transducer to sensing a reflection of that radiated pressure wave by the sensor;
obtaining the primary reflection component of the reflected signal based on the magnitude and the phase of the primary and secondary reflection components;
classifying the object as at least one of the set of object types based on the primary reflection component to obtain a classified object type of the object; and
identifying the object as at least one of a set of objects based on the classified object type of the object.

2. The method of claim 1, further comprising:
sending, by the processing circuitry, to the transducer, the pressure wave signal, wherein the transducer is operable to convert the pressure wave signal to the pressure wave.

3. The method of claim 1, wherein the primary reflection component obtaining step includes:
suppressing the secondary reflection component of the reflected signal based on the magnitude and the phase of the primary and secondary reflection components.

4. The method of claim 1, further comprising:
classifying the object as at least one of a set of object types based on the reflected signal to obtain a classified object type of the object.

5. The method of claim 4, further comprising:
determining a time delay and a magnitude of the primary reflection component based on the pressure wave signal and the reflected signal, wherein the time delay is associated with a time period from radiation of the pressure wave by the transducer to sensing a reflection of that radiated pressure wave by the sensor; and
determining to classify the object responsive to determining that the object is in or about the certain region of the POS system based on the time delay and the magnitude of the primary reflection component.

6. The method of claim 4, further comprising:
processing the reflected signal having primary and secondary reflection components to suppress the secondary reflection component of the reflected signal, wherein a time delay of the secondary reflection component is greater than a time delay of the primary component, with the time delay being associated with a time period from radiation of the pressure wave by the transducer to sensing a reflection of that radiated pressure wave by the sensor;
extracting a property of the primary reflection component based on the processed reflected signal;
wherein the classifying step includes classifying the primary reflection component as at least one of the set of object types based on the extracted property; and
identifying the object as at least one of a set of objects based on the at least one classified object type of the object.

7. The method of claim 6, further comprising:
sending, by the processing circuitry, to neural network circuitry, the extracted property of the primary reflection component, wherein the neural network circuitry is trained with the property extracted from primary reflection components of each object type;
receiving, by the processing circuitry, from the neural network circuitry, an indication that includes the classified object type and a confidence level of the classified object type; and
wherein the identifying step is further based on the confidence level of the classified object type.

8. The method of claim 1, the POS system includes a terminal station device operationally coupled to a conveyor belt apparatus that includes a conveyor belt having a conveying surface, a conveyor motor operable to advance the conveyor belt so that an object placed on the conveying surface is conveyed along a path from a first end to a second end of the conveying surface, with the transducer and the sensor being positioned on or about a top portion of the conveyor belt apparatus so that the field of radiation of the transducer and the field of detection of the sensor are directed towards the certain region on or about the conveying surface of the conveyor belt.

9. The method of claim 1, wherein the POS system includes a terminal station device having a second sensor operable to sense when an object is moved in or about the certain region of the POS system, with the second sensor being positioned on or about the POS system so that a field of detection of the second sensor is directed towards the certain region of the POS system; and wherein the method further includes:
  receiving, by the processing circuit, from the second sensor, a presence signal;
  detecting whether an object is present in or about the certain region of the POS system; and
  sending, by the processing circuitry, to the transducer, a pressure wave signal responsive to detecting that an object is present in or about the certain region of the POS system.

10. The method of claim 1, further comprising:
  identifying the object as at least one of a set of objects based on the classified object type of the object.

11. The method of claim 1, wherein the object types are associated with packaging materials.

12. The method of claim 1, wherein at least one object type is associated with a plastic packaging material.

13. The method of claim 1, wherein the transducer is an ultrasonic transducer, the sensor is an ultrasonic sensor, and the pressure wave includes one or more frequencies of at least twenty kilohertz (20 kHz).

14. A point of service (POS) system, comprising:
  with the POS system having processing circuitry operationally coupled to a transducer operable to radiate a pressure wave and a sensor operable to sense a pressure wave, with the transducer and the sensor being positioned on or about the POS system so that a field of radiation of the transducer and a field of detection of the sensor are directed towards a certain region of the POS system,
  wherein the POS system further includes a memory, the memory containing instructions executable by the processing circuitry whereby the processing circuitry is configured to:
    receive, from the sensor, a reflected signal that represents the pressure wave radiated by the transducer that is reflected from a surface of an object when in or about the certain region of the POS system so that the object can be classified as at least one of a set of object types based on the reflected signal;
    determine a magnitude and a phase of primary and secondary reflection components of the reflected signal based on a pressure wave signal that represents the pressure wave radiated by the transducer and the reflected signal, wherein the primary reflection component corresponds to a direct reflection of the radiated pressure wave from the object and the secondary reflection corresponds to an indirect reflection of the radiated pressure wave from the object or a reflection of the radiated pressure wave from another object, with a time delay of the secondary reflection component being greater than a time delay of the primary component, with the time delay being associated with a time period from radiation of the pressure wave by the transducer to sensing a reflection of that radiated pressure wave by the sensor;
    obtain the primary reflection component of the reflected signal based on the magnitude and the phase of the primary and secondary reflection components;
    classify the object as at least one of the set of object types based on the primary reflection component to obtain a classified object type of the object; and
    identify the object as at least one of a set of objects based on the at least one classified object type of the object.

15. The POS system of claim 14, wherein the memory includes further instructions executable by the processing circuitry whereby the processing circuitry is configured to:
  determine a time delay and a magnitude of the primary reflection component based on the pressure wave signal and the reflected signal, wherein the time delay is associated with a time period from radiation of the pressure wave by the transducer to sensing a reflection of that radiated pressure wave by the sensor; and
  determine to classify the object responsive to determining that the object is in or about the certain region of the POS system based on the time delay and the magnitude of the primary reflection component.

16. The POS system of claim 14, wherein the memory includes further instructions executable by the processing circuitry whereby the processing circuitry is configured to:
  process the reflected signal having primary and secondary reflection components to suppress the secondary reflection component of the reflected signal, wherein a time delay of the secondary reflection component is greater than a time delay of the primary component, with the time delay being associated with a time period from radiation of the pressure wave by the transducer to sensing a reflection of that radiated pressure wave by the sensor;
  extract a property of the primary reflection component based on the processed reflected signal;
  classify the primary reflection component as at least one of the set of object types based on the extracted property; and
  identify the object as at least one of a set of objects based on the at least one classified object type of the object.

17. The POS system of claim 14, wherein the memory includes further instructions executable by the processing circuitry whereby the processing circuitry is configured to:
  send, to neural network circuitry, the extracted property, wherein the neural network circuitry is trained with the property extracted from primary reflections of each object type;
  receive, from the neural network circuitry, an indication that includes the classified object type and a confidence level of the classified object type; and
  identify the object as at least one of a set of objects based on the classified object type of the object and the confidence level of the classified object type.

18. The POS system of claim 14, wherein the POS system includes a terminal station device having a second sensor operable to sense when an object is present in or about the certain region of the POS system, with the second sensor being positioned on or about the POS system so that a field of detection of the second sensor is directed towards the certain region of the POS system; and
  wherein the memory includes further instructions executable by the processing circuitry whereby the processing circuitry is configured to:
    receive, from the second sensor, a presence signal;
    determine whether an object is present in or about the certain region of the POS system based on the presence signal; and
    send, to the transducer, a pressure wave signal responsive to determining that the object is present in or about the certain region of the POS system.

* * * * *